May 18, 1965  R. B. ALEXANDER  3,183,573
APPARATUS FOR MAKING CERAMIC BODIES AND
CERAMIC COMPOSITION FOR USE THEREWITH
Filed July 26, 1960  14 Sheets-Sheet 1
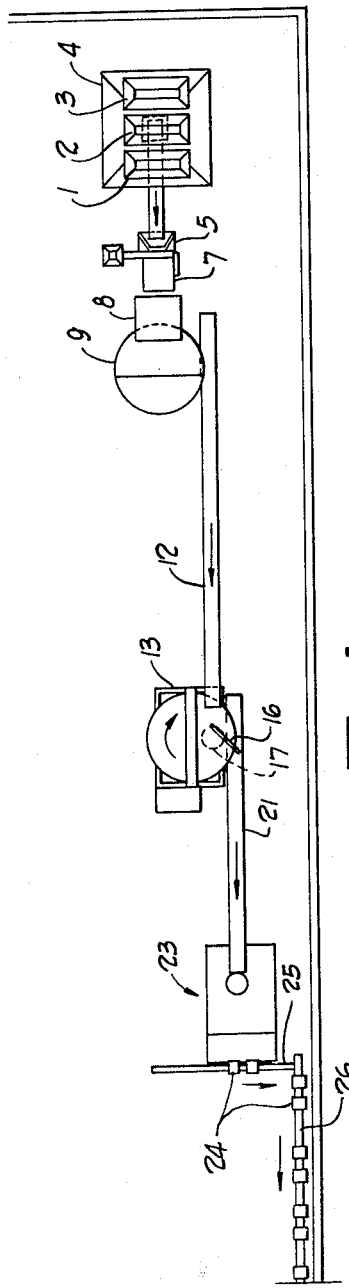
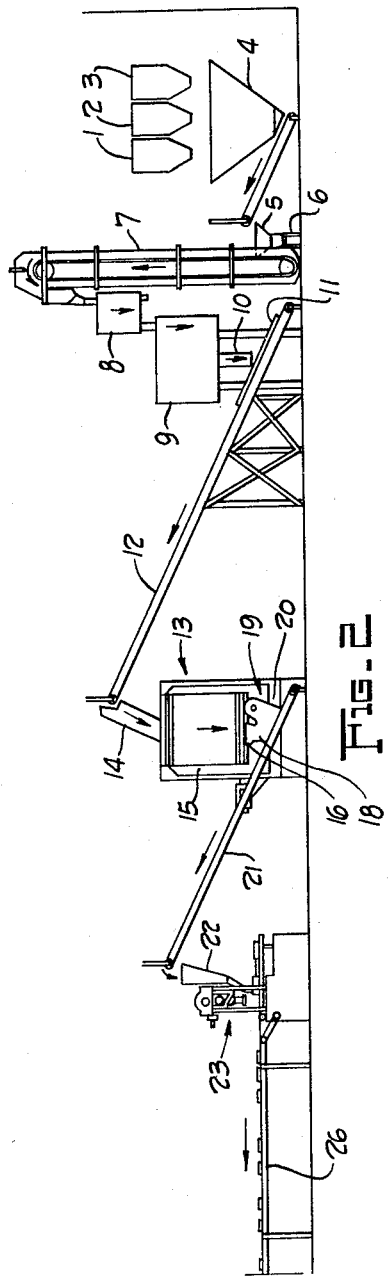
INVENTOR.
R. B. Alexander
BY Robb & Robb
Attorneys.

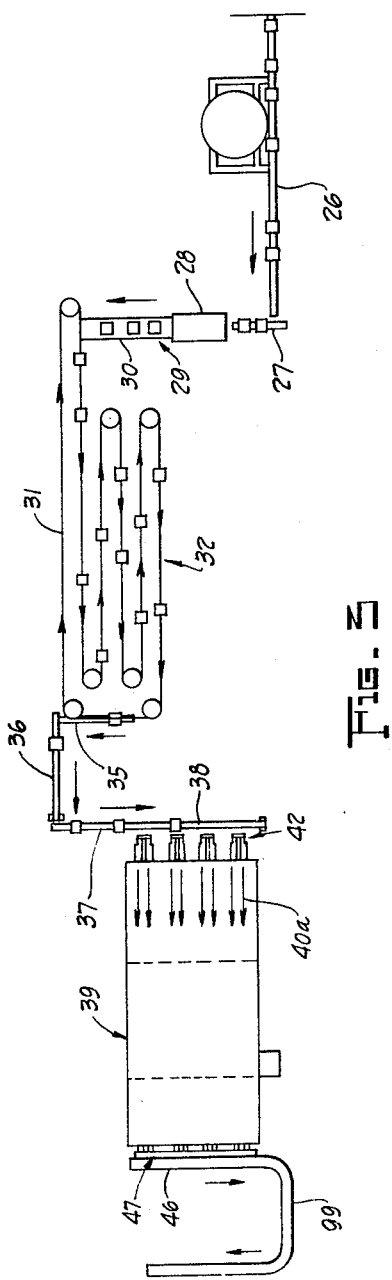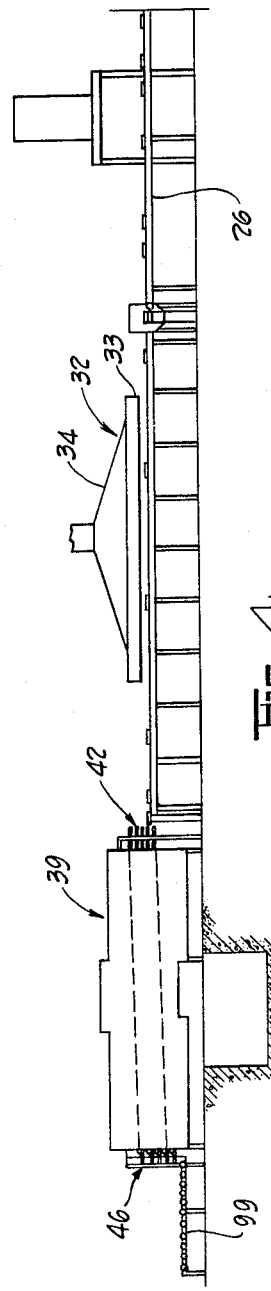

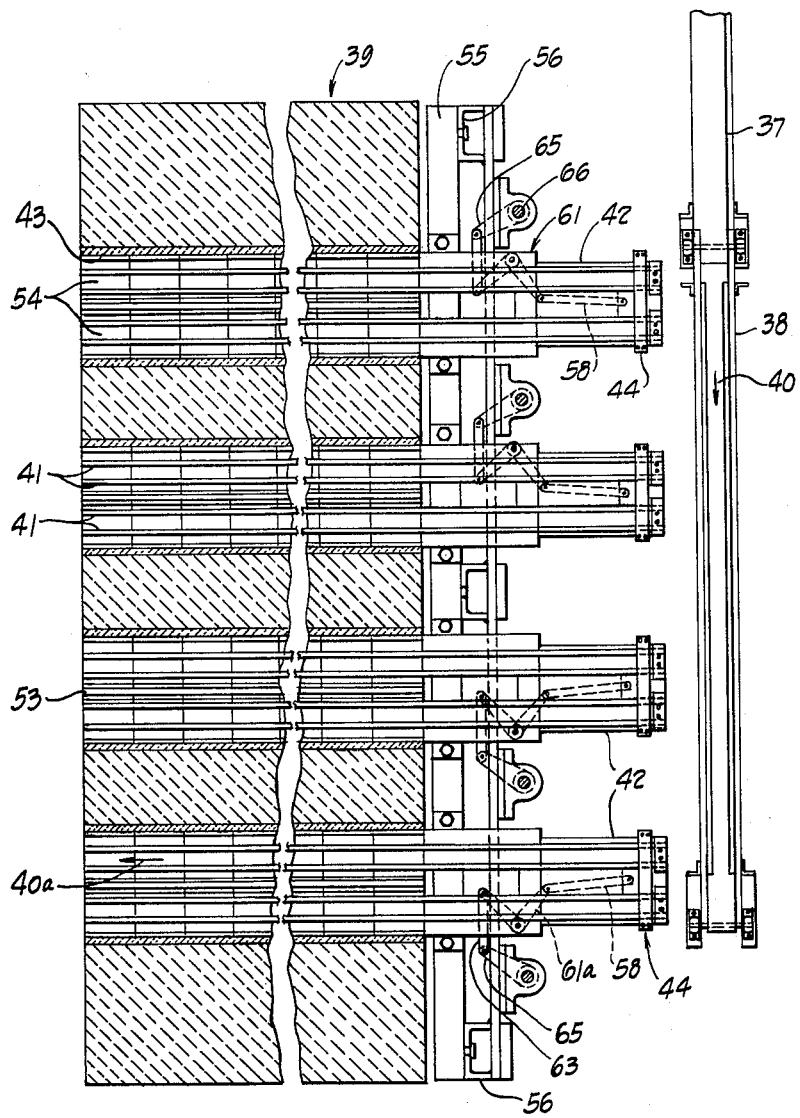

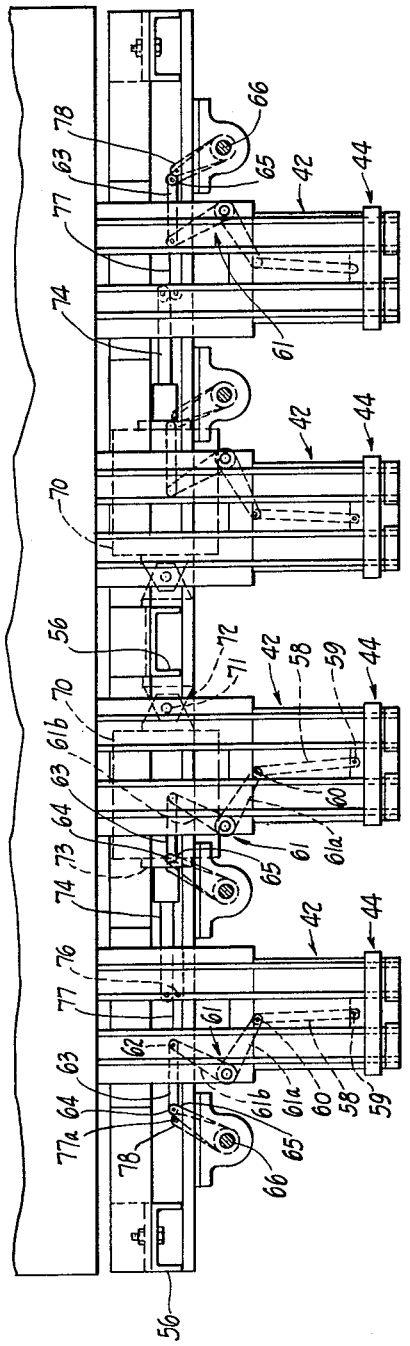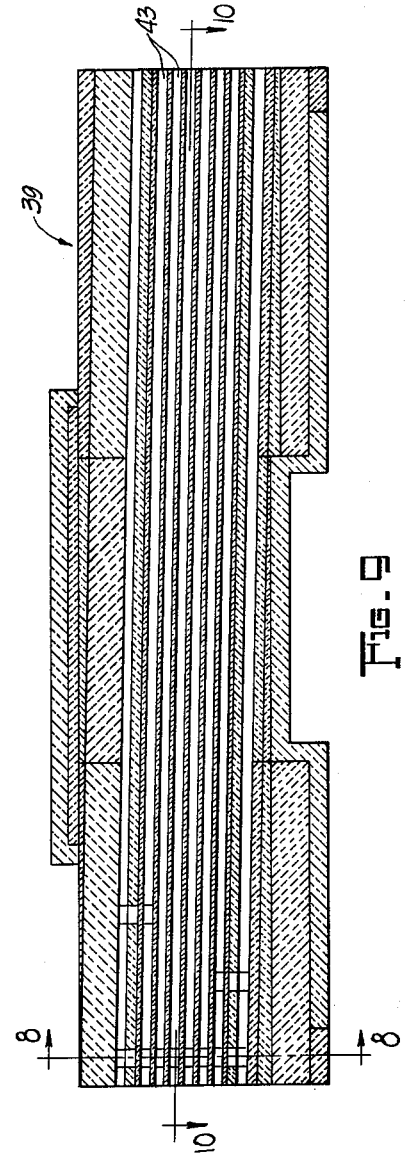

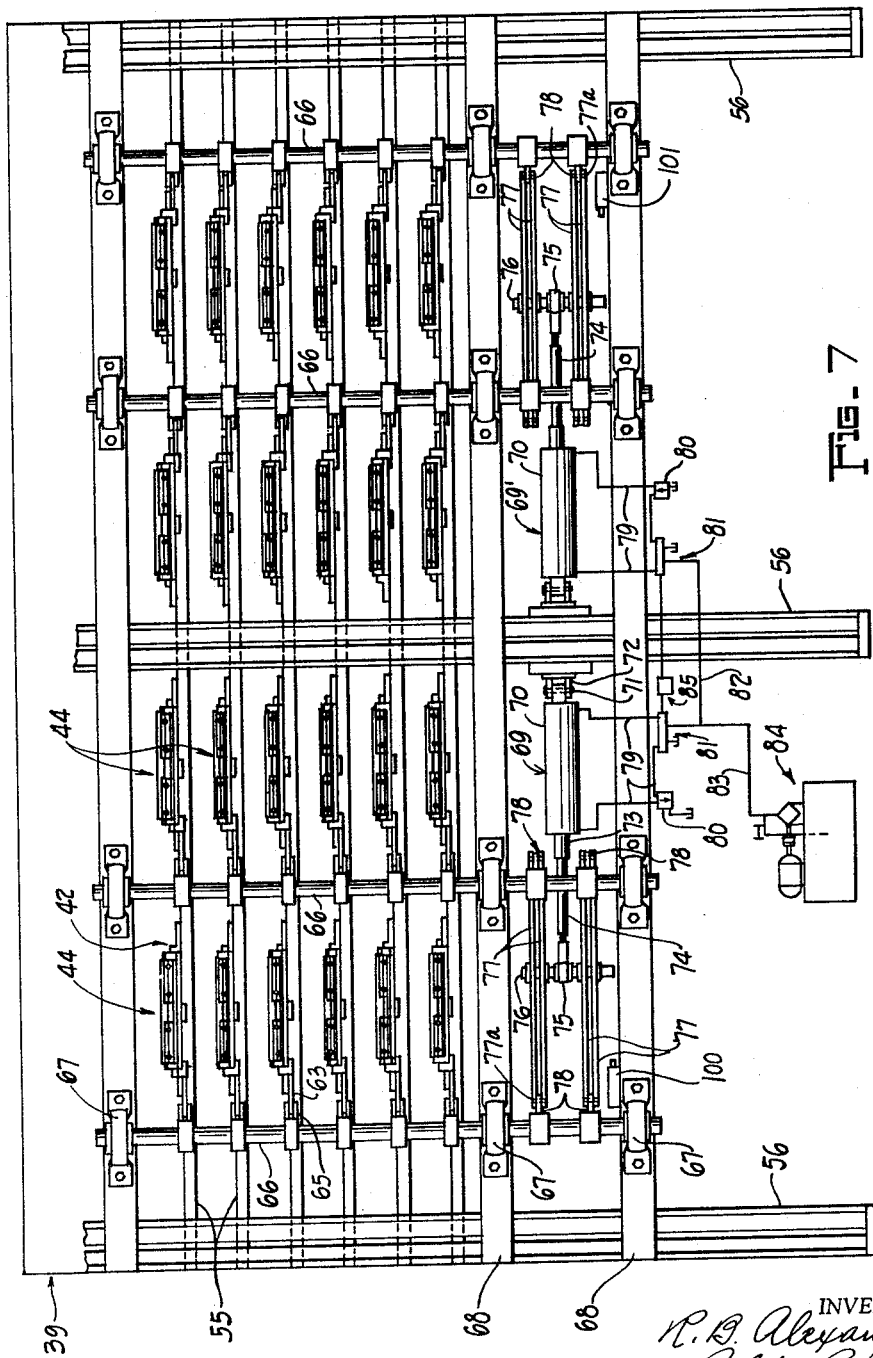

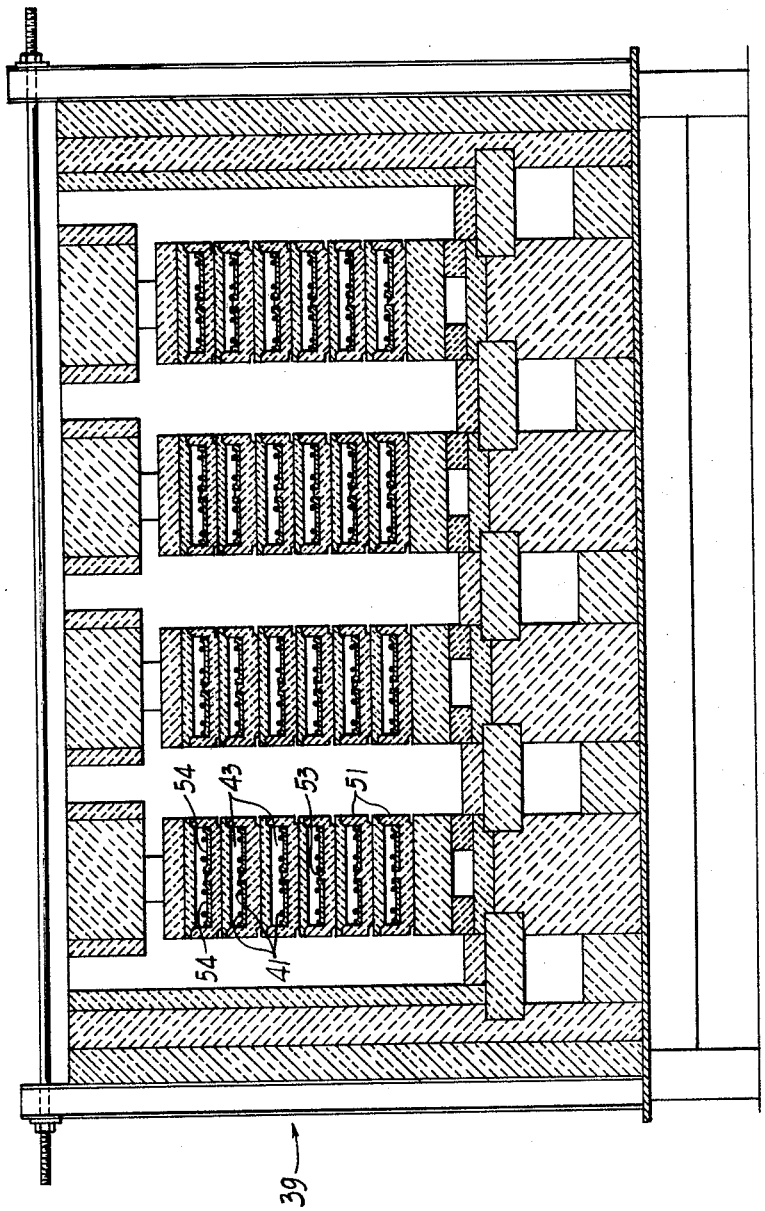

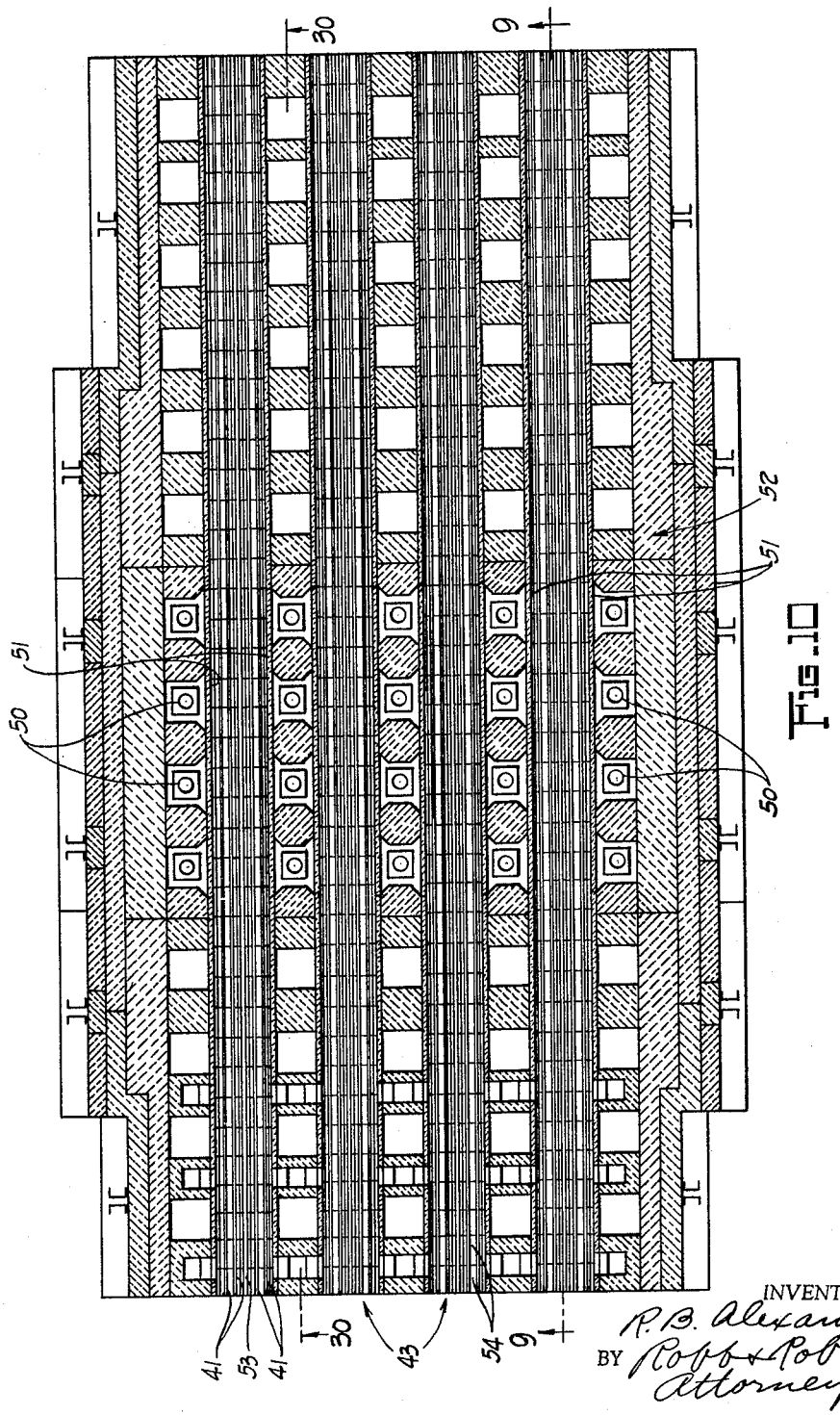

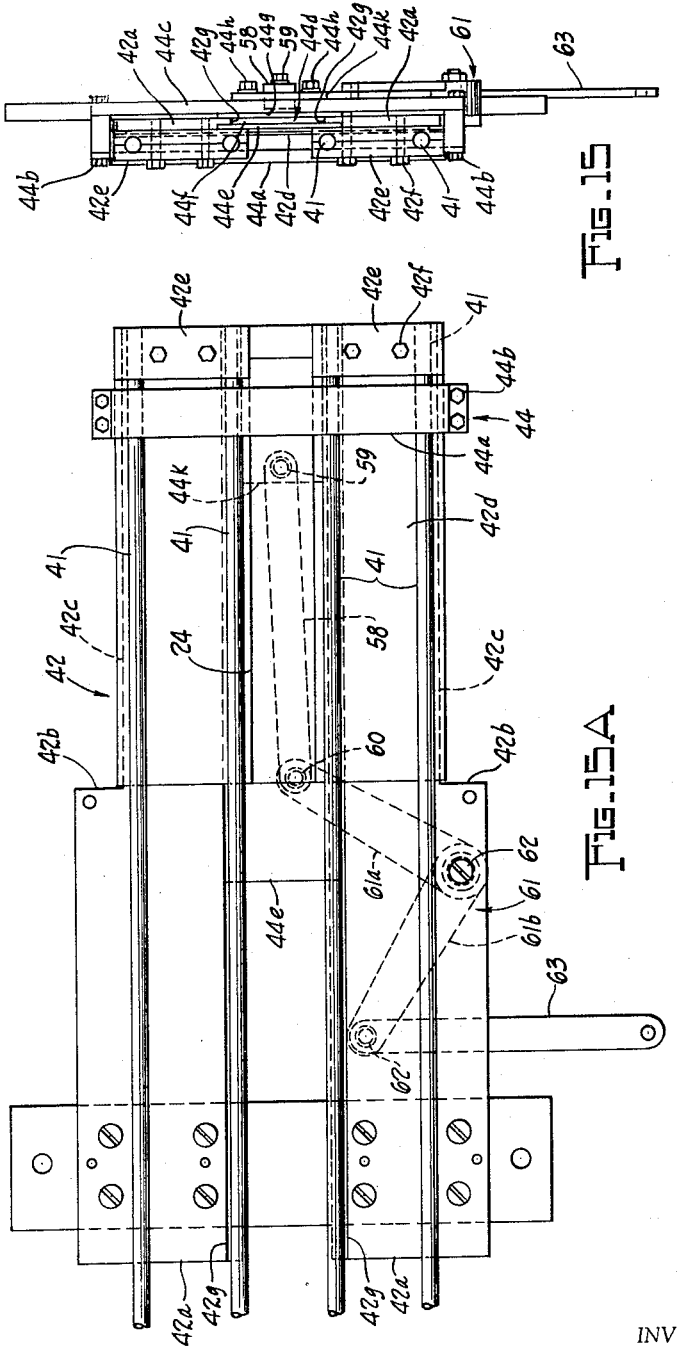

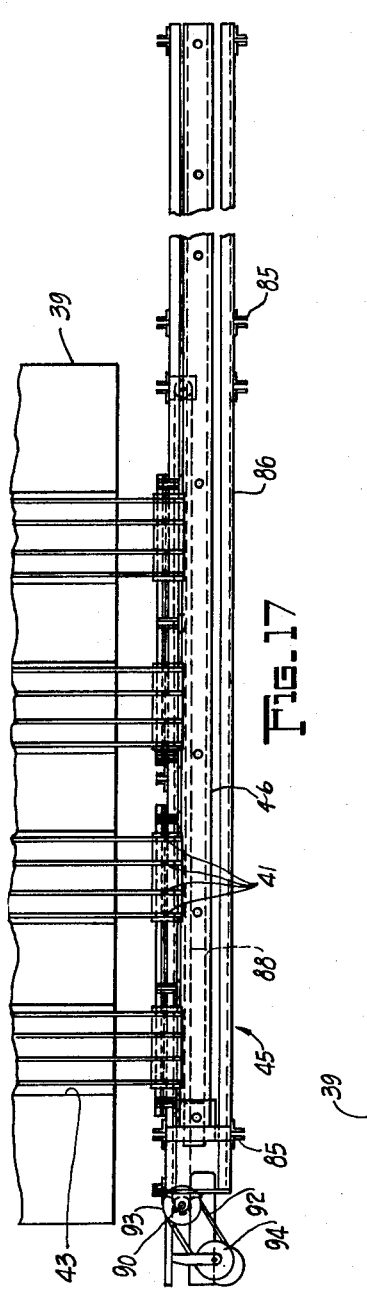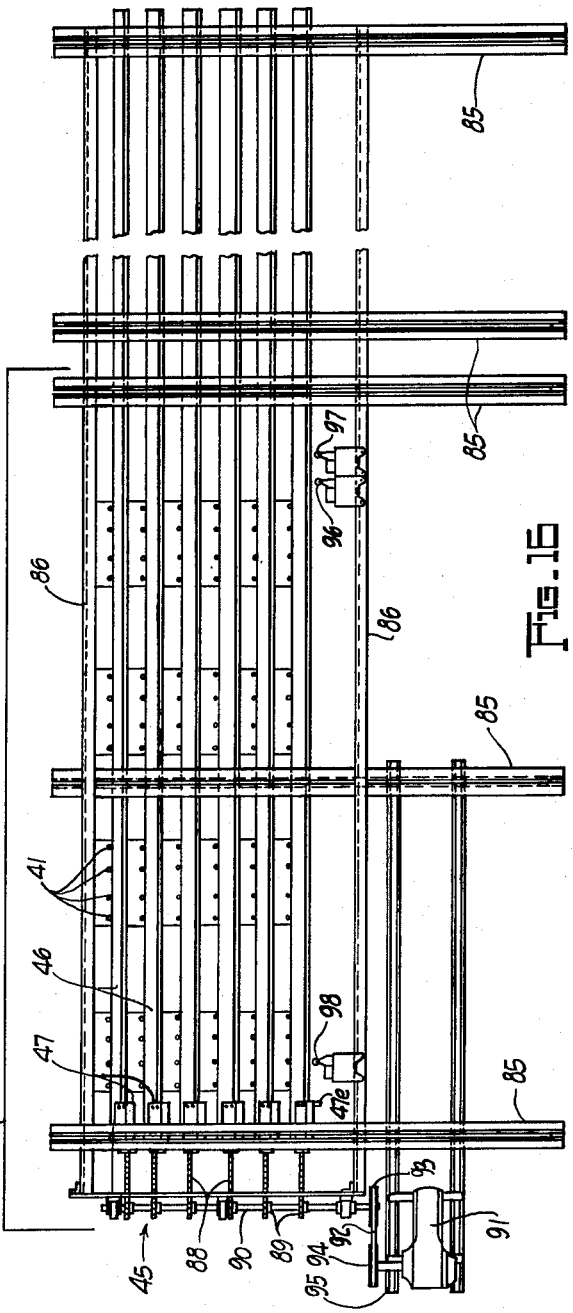

May 18, 1965    R. B. ALEXANDER    3,183,573
APPARATUS FOR MAKING CERAMIC BODIES AND
CERAMIC COMPOSITION FOR USE THEREWITH
Filed July 26, 1960    14 Sheets-Sheet 14

INVENTOR.
R. B. Alexander
BY Robb & Robb
Attorneys

United States Patent Office 3,183,573
Patented May 18, 1965

3,183,573
APPARATUS FOR MAKING CERAMIC BODIES
AND CERAMIC COMPOSITION FOR USE THERE-
WITH
Richard B. Alexander, Anderson, Ind., assignor to National Tile & Manufacturing Co., Anderson, Ind.
Filed July 26, 1960, Ser. No. 45,502
8 Claims. (Cl. 25—142)

This invention relates to the manufacture of ceramic tile, and more particularly, to novel apparatus for making such tile, all designed to enable the manufacture of such tile by a continuous and largely automatic process from raw material to the finished tile product.

The manufacture of such tile as heretofore practiced has involved the pressing of the clay body into a tile shape, then drying the same if necessary before applying glaze thereto, and after that is done the incipient tiles are passed through a kiln or other high temperature furnace for firing the tiles under high temperature therein. In the larger tile factories it has been the previous practice to convey the tiles through the kiln by means of kiln cars and this required the hand placing of the individual tiles in sagger's, setters or other refractory receptacles which in turn were stacked upon the kiln cars. These operations involved a considerable amount of times taking hand operation as well as the use of lifting equipment to emplace the saggers upon the kiln cars and required a large amount of fuel merely for the purpose of heating the refractory material of the saggers and parts of the kiln cars in order to attain the necessary high firing temperature in the kiln.

It is a principal object of the present invention to provide novel apparatus for and process for making tile whereby to enable continuous and largely automatic processing in the manufacture of the tiles from raw materials to finished tile product without the use of kiln cars or saggers, setters, plates or other refractory material usually required in previous processing, the novel apparatus, processing and body composition of my invention enabling elimination of various handling operations and lifting equipment and effecting substantial economies in time, labor cost, fuel, equipment, improved quality, etc.

Another object of the invention is to provide an apparatus for firing bodies of ceramic material by passing them through a continuous kiln or kilns without the use of saggers, setters, bats, slabs, or other refractory material commonly used for supporting such bodies of ceramic materials during firing.

A further object of the invention is to provide a continuous kiln made up of one or more channels, tunnels, or passageways thorugh which ceramic bodies to be fired therein may be caused to travel by means engaging only one of a series of such ceramic bodies in impingement with one another.

A specific object of the invention is to provide a continuous kiln made up of one or more channels, tunnels, or passageways through which ceramic bodies may be caused to travel in such a manner that faster and more uniform firing conditions are made possible.

A further specific object of the invention is to provide such a kiln which is capable of accomplishing the firing operation with desired maturity of the product being fired in less time and with less consumption of fuel than heretofore required.

A still further specific object of the invention is to provide such a kiln of much smaller size relative to productive capacity than was heretofore possible.

Another object of the invention is to provide such a kiln having novel loading and material feeding mechanism for causing travel movement of ceramic bodies through the kiln in a more expedient and efficient manner.

A further object of the present invention is to provide novel unloading and conveying mechanism for unloading fired tile from such kiln and for conveying the same to inspection and packaging stations.

Still a further object of the invention is to provide such a kiln in which the passageways are designed to provide natural draft therethrough whereby to effect heat transfer in a desired manner.

A further object of the invention is to provide such a kiln which is more efficient in creating the desired firing conditions in a more uniform manner and which utilizes the heat given off from fired tile for preheating incoming tile at the entrance end of the kiln.

Another object of the invention is to provide such a kiln having metal, ceramic or combinations of ceramic and metal rails or guides over which the tile bodies pass therethrough which reduce friction of such travel movement.

Another object of the invention is to provide such a kiln with readily removable parts in the passageways so that cleaning thereof and removal of broken tile is enabled to be effected more easily and quickly.

A further object of the invention is to enable the application of glaze to the ceramic body, after pressing same to desired shape and prior to firing, in a more efficient and uniform manner and without preliminary drying of said ceramic body.

Still another object of the invention is to effect drying of the pressed ceramic body in a more efficient manner.

Another object of the invention is to enable production of stronger ceramic bodies more resistant to cracking, breaking etc.

Other objects, advantages, and features of the invention will become apparent from the following detailed description thereof taken in conjunction with the accompanying drawings, in which:

FIGURE 1 is a diagrammatic top plan view showing an arrangement of certain apparatus for processing ceramic tile or other ceramic bodies in accordance with my invention beginning with the introduction of raw materials to apparatus at the right hand end of said figure, said materials being moved from right to left of said figure for processing by the apparatus there shown.

FIGURE 2 is a diagrammatic side elevational view of the apparatus shown in FIGURE 2.

FIGURE 3 is a diagrammatic top plan view showing the arrangement of the remaining apparatus for processing ceramic tile or other ceramic bodies in accordance with my invention and constituting a continuation from right to left of the view of FIGURE 1 beginning with the left hand end of said FIGURE 1 and showing the partially processed ceramic bodies being moved from right to left for processing by the apparatus shown in FIGURE 3.

FIGURE 4 is a diagrammatic side elevational view of the apparatus shown in FIGURE 3.

FIGURE 5 is a horizontal sectional view through the kiln of my invention and showing the loading mechanism at the entrance end of the kiln.

FIGURE 6 is a top plan view showing the loading mechanism at the entrance end of the kiln on a somewhat enlarged scale.

FIGURE 7 is an end elevation looking toward the entrance end of the kiln and showing the loading mechanism.

FIGURE 8 is a transverse vertical section through the kiln, taken substantially on the line 8—8 of FIGURE 9.

FIGURE 9 is a longitudinal vertical section view through the kiln, taken substantially on the line 9—9 of FIGURE 10.

FIGURE 10 is a horizontal vertical sectional view through the kiln taken substantially on the line 10—10 of FIGURE 9.

Figure 11:
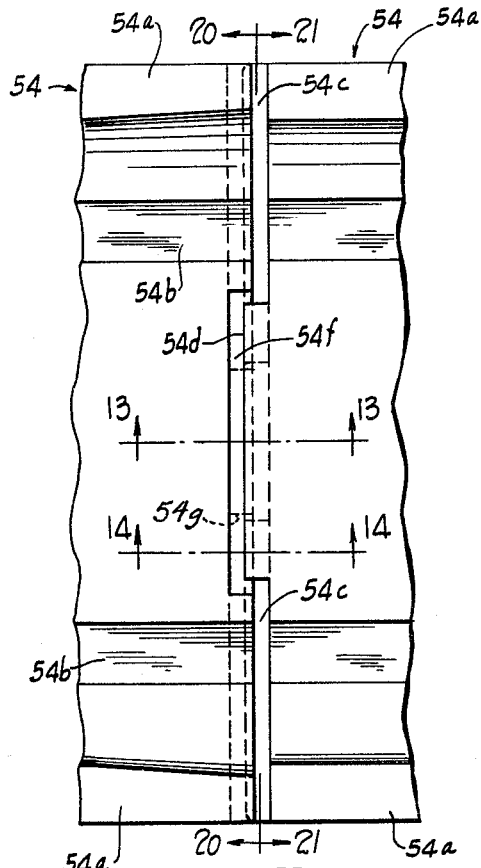

FIGURE 11 is a top plan view showing two adjacent removable refractory floor units, partially broken away, illustrating the interfitting and overlapping relation thereof.

Figure 12:
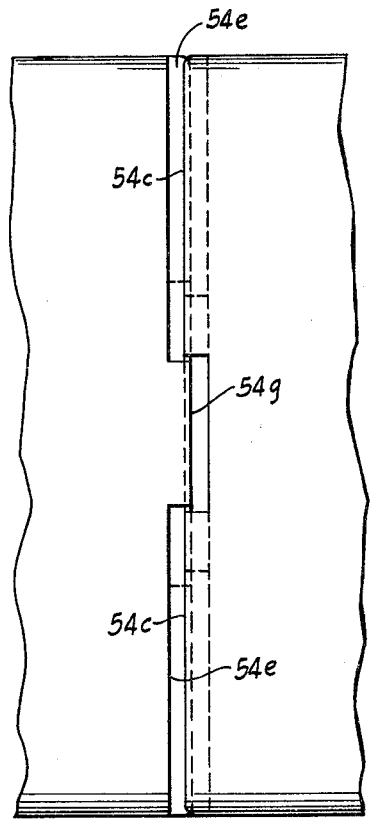

FIGURE 12 is a bottom plan view of the same.

Figure 13:
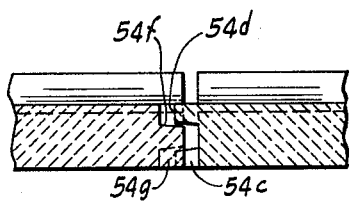

FIGURE 13 is a vertical sectional view taken substantially on the line 13—13 of FIGURE 11.

Figure 14:
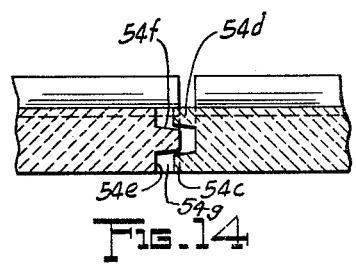

FIGURE 14 is a vertical sectional view taken substantially on the line 14—14 of FIGURE 11.

FIGURE 15 is an end elevation of one of the pusher devices for pushing ceramic bodies through the tunnels through the kiln.

FIGURE 15A is a top plan view of the same.

FIGURE 16 is an elevation looking toward the exit end of the kiln showing the unloading mechanism.

FIGURE 17 is a top plan view of the unloading mechanism.

Figure 18:
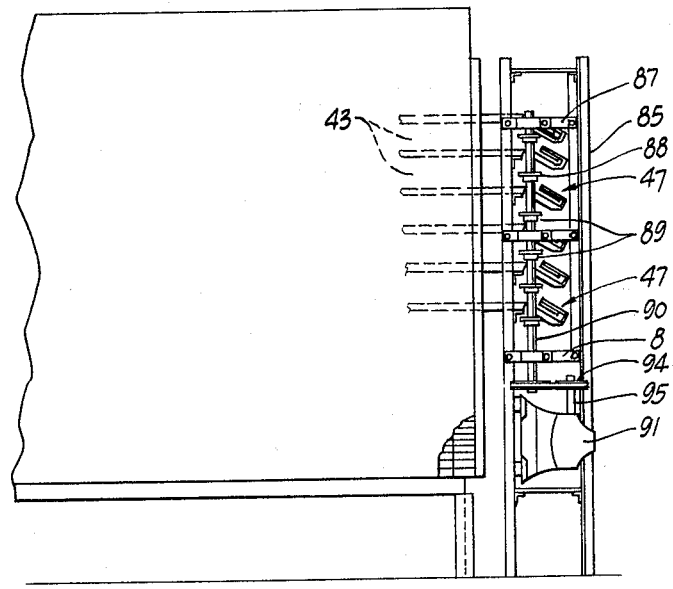

FIGURE 18 is a side elevation of the exit end of the kiln showing the unloading mechanism.

Figure 19:
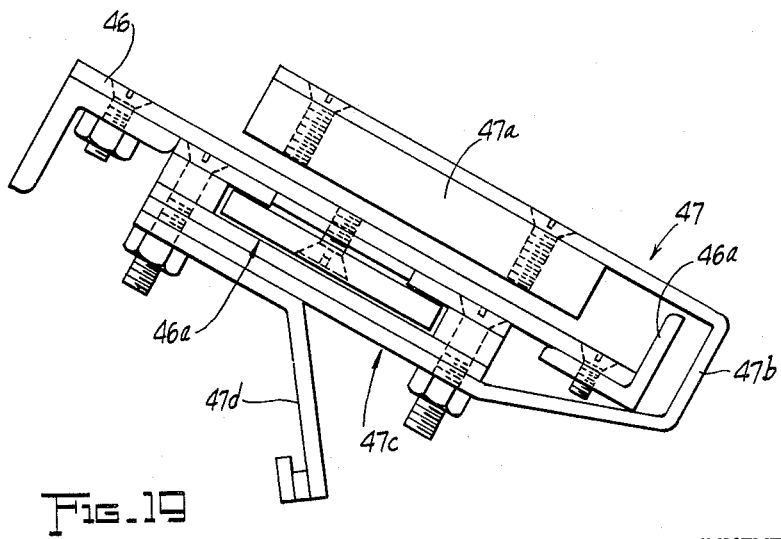

FIGURE 19 is an elevational view showing the mounting of one of the pusher devices on its collector plate of the unloading mechanism.

Figure 20:
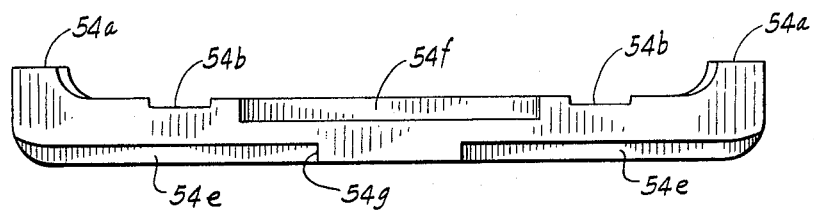

FIGURE 20 is an end elevation of one of the removable refractory floor units.

Figure 21:
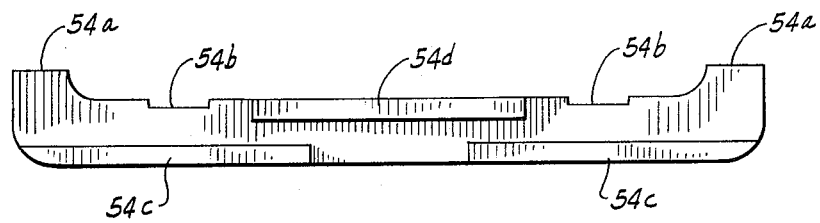

FIGURE 21 is an end elevation of one of the removable refractory floor units looking toward the opposite end from that shown in FIGURE 20.

Figure 22:
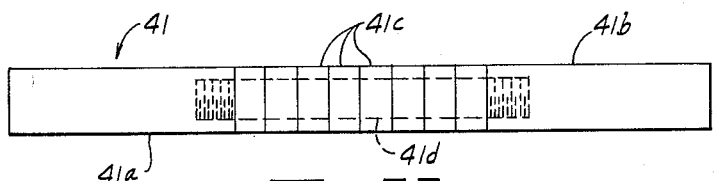

FIGURE 22 is a view illustrating a modified form of guide member for guiding movement of the ceramic bodies through the tunnels of the kiln.

Figure 23:
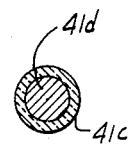

FIGURE 23 is a section of the same.

Figure 24:
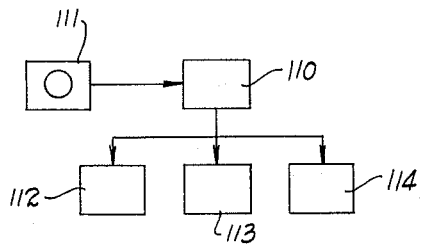

FIGURE 24 is a diagrammatic view illustrating the hook up of instrumentalities for controlling operation of the rotating bin, pulverizer and conveyer for supplying material to the press feed hopper.

Figure 25:
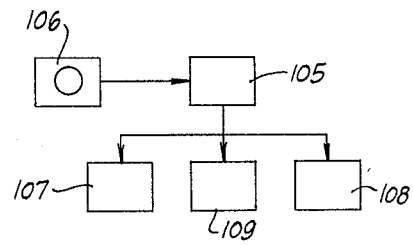

FIGURE 25 is a digrammatic view illustrating the hook up of instrumentalities for controlling operation of the mixer, the discharge gate for said mixer, and the conveyer for supplying material discharged from said mixer to the rotating bin.

Figure 26:
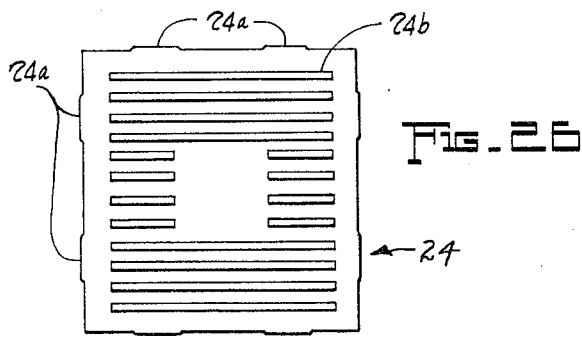

FIGURE 26 is a bottom plan view of a ceramic tile unit such as that which may be formed and processed according to my invention.

Figure 27:
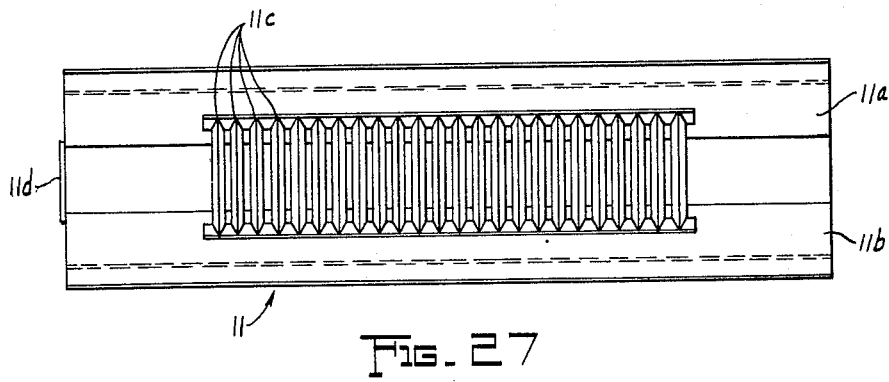

FIGURE 27 is a top plan view of the feed control hopper receiving materials discharged from the mixer.

Figure 28:
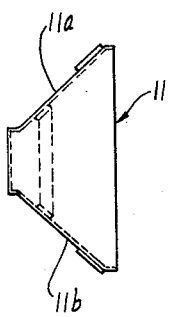

FIGURE 28 is an end elevation of the same.

Figure 29:
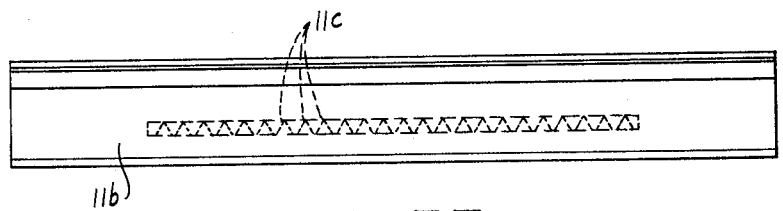

FIGURE 29 is a side elevation of the same.

Figure 30:
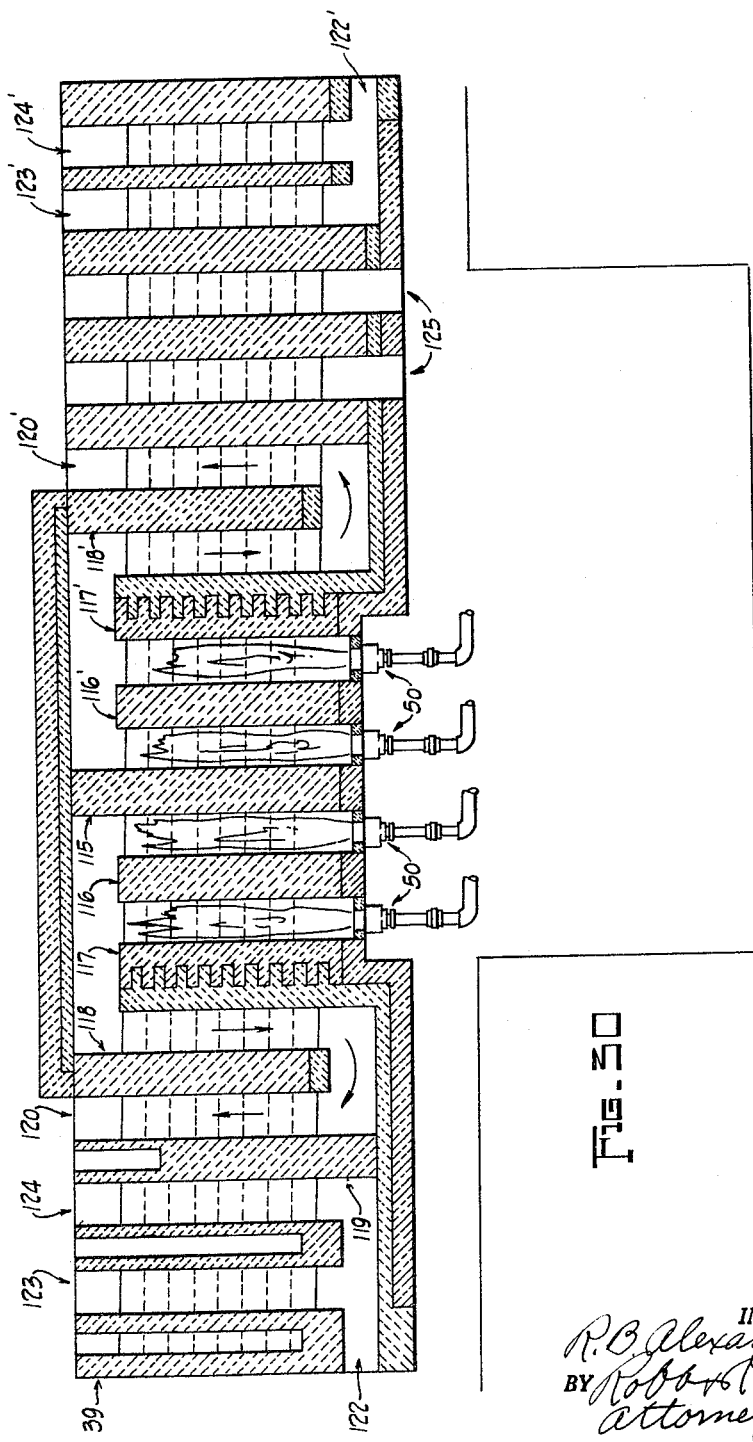

FIGURE 30 is longitudinal vertical section through the kiln taken substantially on the line 30—30 of FIGURE 10.

Now referring to the drawings and describing the invention in detail, and referring first to FIGURES 1 to 4, there is diagrammatically illustrated the arrangement of the complete apparatus for making tile according to my invention.

*General description of apparatus and processing*

The numerals 1, 2 and 3 indicate respectively storage hoppers for containing various materials such as powdered clay and other materials which are combined to provide the body composition for the ceramic bodies which are processed according to the invention. The numeral 4 indicates a weighing batcher for weighing predetermined quantities of the raw materials discharged thereinto from the storage hoppers 1, 2 and 3 in automatically weighed proportions to provide a given batch of the raw materials to be processed into the ceramic body composition.

The proportioned batch of the raw materials provided in the weighing batcher 4 is discharged therefrom into a hopper 5 which in turn discharges into a screw conveyer 6 from which the material is discharged into a bucket elevator 7 which raises the material upwardly for discharging into a sifter 8 which screens or sifts the material in customary manner.

The sifter 8 comprises 6 tiers of Monel metal screens preferably of about ninety mesh. The material entering the sifter 8 passes successively through one of a series of screens arranged one above the other and these screens are vibrated by suitable mechanism so as to sift the material therethrough, the screens serving to remove dirt and impurities from this material, such dirt and impurities being continuously suitably discharged from the sifter so as not to pile up on top of the screen.

From the sifter the material may be conveyed to a suitable storage hopper (not shown) from which storage hopper the material may be discharged into the mixer 9 of conventional type wherein the dry clay and other raw materials are mixed with water. The mixer 9 is one of conventional type employing a rotary plow and muller wheels which mull and mix the dry material with water so that a homogeneous mixture is obtained with the moisture uniformly dispersed throughout the same.

In the mixer 9 sufficient water is added to provide a proportion of moisture approximating ten percent of the weight of the mixed material when discharged from the mixer through the chute 10. The mixer 9 operates through a predetermined length timed cycle and when this cycle is completed the material in the mixer 9 is discharged by opening a door (not shown) in the bottom thereof which permits the mixed material to be discharged through the chute 10 into a feed control hopper 11 which controls feeding of the discharged material onto the inclined belt conveyer 12 in such a manner that the quantity of mixed material deposited upon the belt conveyer 12 is not so heavy as to overload the belt or cause stoppage thereof.

Since the material is not discharged from the mixer 9 continuously but only at the end of each mixing cycle, the belt conveyer 12 need not run continuously and thus suitable timer control means may be provided for automatically opening the discharge door at the bottom of the mixer 9 at the end of such cycle and simultaneously starting the belt conveyer 12 into operation to convey the material deposited on said belt conveyer 12 to the combination bin and feeder 13. As illustrated in FIGURE 25 the said timer control means may include a timer device 105 which is set into operation by actuation of mixer control switch 106 which starts operation of the electric motor for rotating the rotary plow and muller wheels of mixer 9 and the timer 105 will serve at the end of a preselected time interval to start operation of motor 107 for operating the mixer discharge door and said timer 105 will also simultaneously set into operation motor 108 for operation of conveyer 12 at the end of the same preselected time interval.

The feed control hopper 11 has sloping sides 11a and 11b converging toward the bottom and within the hopper and near the bottom thereof are provided a series of horizontally spaced angle brackets 11c extending horizontally between the sides 11a and 11b. As seen best in FIGURES 27 and 29 the angle brackets 11c are triangular in shape with their apices at the tops thereof and are arranged so as to receive a substantial portion of the weight of the material discharged from the chute 10 of the mixer 9 so as to relieve the belt of the conveyer 12 from the need for supporting the entire weight of the discharged material and thus prevent jamming of the conveyer belt while permitting controlled feeding of the material to the conveyer belt by filtering between the angle brackets 11c. The feed control hopper 11 may also be provided with a sliding discharge gate 11d at the bottom thereof which may be controlled for actuation by a motor 109 set into operation for opening said discharge gate by said timer device 105 simultaneously with operation of motor 107 for opening the mixer discharge door and motor 108 for starting conveyer 12, as above described.

The belt conveyer 12 is inclined at an angle of about twenty-six degrees (26°) from the horizontal which is about as steep an angle as can be availed of to enable the ceramic body composition material discharged from the chute 10 through the feed control hopper 11 and deposited upon said belt conveyer 12 to be carried upwardly thereby without tending to roll backwardly down the incline of the belt conveyer 12 toward the point where the material was initially deposited thereon.

As indicated, the belt conveyer 12 serves to convey the damp mixed ceramic body composition material upwardly for discharge into the chute 14 directing said composition material into the hopper 15 of the combination bin and feeder 13. The hopper or bin 15 rotates and there is a stationary plow 16 adjacent the bottom thereof against which the composition body material in the hopper 15 impinges as the latter rotates. The composition body material impinging against the stationary plow 16 is forced out of the bottom opening 17 of the hopper into a collecting conduit 18 of a pulverizer generally indicated by the numeral 19. The amount of material moved out of the hopper 15 into the pulverizer is controlled by the speed of rotation of the hopper 15 and the height of the plow 16. The hopper 15 is large enough to contain several batches of the material previously mixed in the mixer 9. For example the hopper 15 may be designed to contain three 2,000 pound batches or a total of 6,000 pounds. Thus three 2,000 pound batches can be made at any continuous operation of the mixer 9 and moved therefrom into the hopper 15.

The hopper 15 is almost totally enclosed and thus retains a large proportion of the moisture in the mixed body composition material contained therein.

The pulverizer 19 is essentially a hammer mill. As the hammers thereof rotate they hit the lumps of wet mixed body composition material that are plowed out of the bottom of the bin or hopper 15 and thus said material is broken up into a very fine powder with the moisture largely retained. One percent (1%) of the moisture may have been lost by transferring from the feed control hopper 11 up the belt 12 and into the bin or hopper 15 of the combination bin and feeder 13. Some of the moisture escapes from the material in the hopper 15 and some moisture is lost as the material passes out of the hopper 15 into the pulverizer and still further moisture is lost in the pulverizer itself. However enough moisture is initially put into the body composition material in the mixer 9 to compensate for the subsequent loss sustained. The moisture content is calculated carefully so as to provide the body composition material with just the right amount of moisture when said material reaches the position at which it is pressed into tile shape in the press.

As above indicated, the purpose of the hammer mill pulverizer is to break up the body composition material into a fine powder and convey it to a hopper chute 20 from which it is deposited upon the belt conveyer 21 in a manner to prevent dust as much as possible. The conveyer belt 21 conveys the material deposited thereon upwardly and discharges said material into the hopper 22 of the tile press generally indicated by the numeral 23.

The rate of movement of the composition body material to the hopper 22 is automatically controlled by the amount of material in the hopper 22. For this purpose time control means is provided which is designed to keep the level of body composition material in the hopper 22 within certain limits, said control means being operative to actuate or set into motion the conveyer 21, rotating bin 15 and pulverizer 19 to supply more material to the hopper 22 to bring the quantity of such material therein up to a predetermined upper limit level. For example the time control means may be adjusted so that when enough time has elapsed in the operation of the press 23 to allow the level of material in the hopper 22 to drop a certain distance, said control means will be operative to initiate operation of the bin 15, pulverizer 19, and conveyer belt 21 automatically to run for a predetermined time cycle sufficient to cause the hopper 22 to be filled back up to its desired upper limit level. As illustrated in FIGURE 24, the said time control means may include a timer device 110 which is set into operation by actuation of control switch 111 which starts the motor for operating the press 23 mechanism, the timer 110 being adapted at the end of a preselected time interval to set into operation the motor 112 for rotating the bin 15, the motor 113 for operating the pulverizer 19, and the motor 114 for operating the conveyer 21, these motors being set into operation simultaneously at the end of said preselected time interval.

It should be noted that the combination bin and feeder 13 is designed to feed the pulverizer 19 with material at a rate to prevent overloading of the pulverizer and yet supply adequate quantity of material to the press storage hopper 22. The components of the system are therefore made to operate in a manner such that there is a continuous flow of material from the hopper 15 to the pulverizer 19 and so that there is no overloading or underloading of the latter. It is also to be noted that the incline of the belt conveyer 21 is preferably approximately 26° from the horiozntal as in the case of the belt conveyer 12 and for the same reason.

The body composition material in the press storage hopper 22 is fed therefrom to the cavities in the press which define the outline of the tile unit to be formed thereby. The press 23 is a conventional type embodying a cavity unit that runs on a bench and passes under the ram of the press, there being a pair of cavities in the cavity unit which are alternately filled with the body composition material and passed under the ram of the press for compressing said material into the tile shaped units defined by the said cavities. These green tile units are formed under tremendous pressure in the cavities of the press which serves to compress the composition material comprising clay and other minerals into a cohesive unit of tile shape which is formed on the back side with ribs 24b and on its edges with lugs, there being a pair of such lugs designated 24a on each of the four edges of each tile unit such as 24. The green tile units are formed in the press up-side-down and as they are moved out of the cavity after pressing they are immediately turned over so that subsequent movement of the green tile units through the various operations take place with the tile unit supported on its ribbed bottom or back.

The green tile units are automatically emplaced on a belt conveyor 25 which passes the tile units 24 under tipped knives which are arranged to bevel two opposite edges of the tile unit by shaving the same.

The green tile units pass from the conveyer 25 to the conveyer 26 whose direction of movement is at right angles to the direction of movement of the conveyer 25. In passing from the conveyer 25 to the conveyer 26 the tile units are not turned but their other edges are passed under tipped knives which serve to bevel these edges as in the manner above indicated.

The green tile units pass from the conveyer 26 to a belt conveyer 27 arranged for movement in the direction at right angles to the direction of movement of the conveyer 26. The conveyer 27 conveys the green tile through the spray booth 28 within which the upper faces of the green tile units are sprayed with liquid glaze directed onto the upper face of the tile units by means of suitable spray nozzles, the glaze being sprayed onto the tile units at low pressure of less than 25 pounds per square inch, and preferably within the range of 5 to 10 pounds pressure per square inch, which enables the green tile units to be properly sprayed with use of less glaze and obtaining a more uniform thickness of glaze coating without drying of the tile units preliminary to spraying of glaze thereon.

On account of the fact that when the green tile units were ejected from the mold cavities of the press and turned over, they were deposited on the conveyer 25 with the ribs on the back side of the tile extending transversely relative to the direction of movement of the conveyer 25, and since the green tile units were not turned subsequently in passing along the conveyers 25, 26 and 27, their disposition relative to the conveyer 27 is likewise with the the ribs extending transversely of the direction of movement of that conveyer. Therefore after passing through the spray booth 28, the green tile units sprayed therein are caused to be turned or rotated ninety degrees (90°) by a suitable turning device located at the station 29. When the tile units are so rotated during their travel movement along the conveyer 30 said tile units will be disposed with their ribs extending longitudinally of or parallel to the direction of travel of the conveyer 30. This turning or rotating of the tile units at the station 29 is accomplished so that the tile units will end up properly positioned for loading into the kiln after their subsequent movement by the conveyer to that point.

In this connection it should be noted that the tile units pass through the kiln by sliding on rails or guides 41 and it is desired to have the tile units properly positioned when they reach the kiln so that they can be loaded into the latter with the ribs 24b of the tile arranged parallel to the rails or guides. It will be noted that the tile units are arranged with the ribs 24b transverse to the direction of movement as the same pass through the spray booth and in the spraying operation there is some overspray which causes glaze to adhere to the leading and trailing edges of the tile. Since the tile pass through the kiln in engagement with one another being pushed through the kiln by sliding on the guides 41, if these glaze sprayed edges of the tile were engagement with the other units, the tile units would tend to adhere or be welded together during firing in the kiln. For that reason as will be noted, the passage of the tile units through the spray booth in the manner indicated with the ribs disposed transversely of the direction of movement and the subsequent rotation of the tile units enables the glaze overspray to be directed onto edges of the tile which will not be in engagement with one another and thus prevents the tile units from being adhered or welded to one another due to edge engagement thereof during passage through the kiln for firing of the tile.

The tile units sprayed with glaze pass from the flat belt conveyor 30 onto a steel link belt conveyor 31 having crescent shaped links, said conveyor moving the tile in the direction of the arrows back and forth beneath an infrared drier unit generally indicated by the numeral 32 and consisting of infra-red gas heater 33 having a suitable number of burners designed to produce infra-red rays of a desired wave length and capable of heating the tile units passing thereunder to a temperature of about 150 to 200 (F.) degrees so as to withdraw from the tile units a desired percentage of moisture preliminary to firing of the tile in the kiln so as to leave only sufficient moisture in the title units to enable the same to remain in a cohesive condition having sufficient strength to withstand the pressure to which it is subjected in being pushed through the kiln. Thus the amount of moisture which has to be taken out of the tile units during the firing operation in the kiln is of little consequence.

In the foregoing connection, it may be noted that when the tile units leave the press they have a moisture content of about ten percent (10%) and when the tile units are passed through the glaze spray unit this adds another approximately ten percent (10%) of moisture, the moisture content being about twenty percent (20%) at this point. This percentage of moisture cannot be efficiently removed during the firing operation in the kiln and if the removal of such an amount of moisture were to be accomplished in the kiln, the length of the same would have to be increased and the tile gradually brought up to the necessary high firing temperature in a more gradual manner as otherwise quickly bringing the tile to a high temperature with a high percentage of moisture therein would produce thermoshock which would cause shattering of the tile units. It is necessarily desirable to make the kiln of as short a length as possible yet which is capable of accomplishing the firing of the tile in the desired manner so as to produce a high grade and highly cured tile body which is highly resistant to shock to which the same is subjected in use. Therefore the process of making the tile according to my invention contemplates the preliminary drying of the tile units in the infra-red drier 32.

It should be noted that the link belt conveyer 31 is out in the open and the burner or heater unit 33 does not require any shroud or closure but merely has a hood within which the burners are located so as to direct the infrared heat towards the tile. The fact that the drier is out in the open eliminates some of the problems involved since the body is porous and, the moisture can be driven off more readily. The drier unit includes an exhaust hood 34 which is arranged over the top of the burners so that it carries off the burned gases as well as the moisture removed from the tile in the drying process and likewise the exhaust hood carries off the carbon monoxide gas. The heater unit 32 acts primarily by infra-red heat; no flame atmosphere actually comes in contact with the tile and the drier does not adversely affect the surrounding atmosphere to any material extent in view of the fact that the burned gases and moisture are carried off by the hood and the heat effect of the drier is confined substantially within the area traversed by the link belt conveyer carrying the tile to be dried. It will be noted that the course of the link belt conveyer is arranged so that it passes back and forth lengthwise and gradually laterally of the drier units so as to most efficiently utilize the heating effect upon the tile produced by such drier unit.

As the conveyer 31 brings the tile units carried thereby along their last course through the drier unit, at the end thereof the tile units pass onto a flat belt conveyer 35 moving the tile in the direction of the arrow and from this latter conveyer the tile units pass onto the flat belt conveyer 36 whose direction of travel is at right angles to the direction of travel of the conveyer 35. From the conveyer 36 the tile units pass onto a conveyer 37, 38 again arranged at right angles to the direction of movement of the conveyer 36 which carry the tile units transversely of the kln 39 adjacent the loading means at the entrance end thereof so that an operator can readily remove the tiles from the conveyer 38 and load the tiles onto the kiln loader means in the manner hereinafter described.

The conveyers 37, 38 are arranged to bring the tile units up to the front or entrance end of the kiln 39, the conveyer 38 being located immediately adjacent the latter. It will be noted that the conveyer 38 is arranged to move the tile units in a direction as indicated by the arrows 40 transversely of the direction of movement of the tiles through the kiln as indicated by the arrows 40a. The tile units 24 are disposed on the conveyer 38 with the ribs 24b extending transversely of the direction of movement of the conveyer 38 and thus parallel to the direction of movement of the tile units through the kiln 39. The conveyer 38 is arranged in such a manner that an operator standing facing the entrance end of the kiln with the conveyer 38 between the operator and the kiln may conveniently pick the tile units off the conveyer 38 as the same is moving and place such tile units 24 in position to be pushed through a respective one of a plurality of tunnels extending longitudinally through the kiln 39. In passing through the kiln 39 each tile unit 24 slides on the upper surfaces of a respective pair of rails or guides 41 extending from end to end through a respective longitudinal tunnel through the kiln 39, said guides extending outwardly of the front or entrance end of the kiln, said guides being suitably supported on one of the pusher frames such as 42 located outwardly of the entrance end of the kiln 39. Each of the tile units 24 is so placed in position with lugs 24a of one tile unit in edge to edge engagement with lugs 24a of an adjacent tile unit and with the ribs 24b parallel to the guides 41 in such a manner that each of the respective pairs of the guides 41 engages the tile units between a respective pair of the ribs 24b which thus serve to guide the tile units in their movement along the guides 41 through the respective longitudinal tunnel 43 of the kiln 39.

Suitable pusher means is provided to push the tile units 24 in edge to edge engagement along the rods 41 through the tunnels 43 of the kiln, such pusher means including a respective pusher 44 slideably mounted on each of the pusher frames 42, the pushers 44 being engageable with edges of tile units which have been placed in position on the guides 41 between the pusher 44 and the entrance to the respective tunnel 43. The pushers 44 work in timed sequence to push toward the respective tunnel entrance tile units 24 newly placed in position for pushing engagement by the pusher 44 whereby the pushers 44 serve to push a series of tile units 24 disposed for sliding movement on a respective pair of guides 41 through a respective tunnel 43 with such series of tile units 24 in edge to edge engagement of their lugs 24a with one another.

In passing through the tunnels of the kiln 39 the tile units 24 are fired and cured at high temperature and the tunnels are arranged in a novel manner to be hereinafter described so as to preheat the tile units as they pass into the kiln and gradually bring the same to the desired highest temperature after which the tile are cooled gradually as they reach the exit end of the kiln.

At the exit end of the kiln 39 there is provided suitable unloading means for automatically collecting the tile units discharge from the kiln and moving them to an inspection and packaging area. Said unloading means is generally indicated by the numeral 45 and comprises a plurality of collector slide plates 46 extending horizontally below the exit ends of each series of horizontally spaced tunnels 43. Said unloading means further includes pusher means including a respective pusher 47 for each collector slide plate 46 and arranged to push the tiles discharged from the kiln onto the collector slide plate therealong in timed sequence to the operation of the pusher means previously referred to located at the entrance end of the kiln. In this connection it may be noted that the pushers 47 of the collector means operate simultaneously to move the tile units along the collector slide plates 46 at such intervals in the sequential operation of the movement of the tile units through the kiln tunnnels soon after tile units have been discharged from tunnels 43 onto the collector slide plates 46.

From the foregoing it will be understood that the apparatus and process of my invention provides an almost entirely automatic method of processing tile from raw materials to finished product including automatic proportioning and processing of the composition forming the body of the tile units, forming of such composition into the tile units, spraying said units with glaze, prelimininary drying of the tile units prior to firing thereof in the kiln, automatic movement of the tile units through the kiln, and automatic movement of the tile units discharged from the kiln to the inspection and packaging area.

Having thus described the general nature of the apparatus and processing according to my invention, certain features of the apparatus and processing will now be discussed in more detail under appropriate headings.

*The kiln*

Referring now to FIGURES 5 through 10, 15, 15-A, and 30 particularly, the kiln 39 is provided with a series of tunnels or channels such as 43, previously mentioned, extending longitudinally through the kiln from the entrance end thereof to the exit end thereof. These tunnels or channels are arranged so as to slope downwardly from the entrance end to the exit end of the kiln, for example, at approximately a two percent slope from the horizontal whereby to provide a chimney effect so that air entering the tunnels at the exit end of the kiln is provided with a natural draft by virtue of the inclination of the tunnels causing the air to pass therethrough toward the entrance end of the kiln.

The kiln 39 (FIGURES 10 and 30) is lined with suitable refractory material and provided with refractory walls between the tunnels and about centrally of the kiln there are provided a plurality of gas fired burners 50 located in the vertical spaces between the refractory walls 51 lining the tunnels 39 and also located between the refractory wall 51 and the heavy duty refractory brick walls 52 which are the outer walls of the kiln.

These burners are located in a muffled combustion chamber, as shown in FIGURE 30, provided with baffles therein arranged to cause the burner flames or the heat therefrom to follow a circuitous path before being exhausted to the atmosphere, thereby accomplishing a more efficient distribution of the heat produced. As seen in FIGURE 30, the left hand pair of buners 50 is separated from the right hand pair of burners by the inter-position of a wall 115 of refractory material. The two left hand burners 50 are arranged so that there is interposed therebetween a baffle 116, and to the left of these burners a second baffle 117 extends upwardly from the base of the kiln to the same height as the baffle 116, the tops of said baffles being spaced from the top of the combustion chamber.

To the left of and spaced from the baffle 117 is a baffle 118 extending downwardly from the upper wall of the combustion chamber. To the left of the baffle 118 and spaced therefrom there is provided a baffle 119 which extends upwardly from the base of the kiln and in conjunction with the baffle 118 provides there between a chimney 120 for exhaust to the atmosphere of the gases produced by the left hand pair of burners 50 referring to FIGURE 30. The arrangement of the baffles 116, 117, 118, and 119 is such as to provide a common horizontal passageway above the left hand pair of burners 50 through which the flames produced by those burners or the heat therefrom may pass and thence downwardly through the passage provided between the baffles 117 and 118, thence around the bottom of the baffle 118 and then upwardly to be exhausted from the chimney 120. The baffles, being made of refractory material and being arranged in the manner indicated serve to muffle the flames from the left hand pair of burners 50 so as to cause the same or the heat therefrom to travel in the circuitous path indicated which provides a more efficient distribution of the heat produced. Because of the location of the burners in the spaces between refractory walls, no flame atmosphere actually comes in contact with the ceramic tile or other ceramic bodies which are caused to pass through the tunnels 43 of the kiln of firing and curing therein.

Similarly, the combustion chamber for the right hand pair of burners 50, referring to FIGURE 30, has similarly arranged baffles 116', 117' and 118' providing the circuitous path for the flames or heat and eventual exhaust of the gases through the chimney 120'.

The burners 50 are located centrally of the kiln to provide the highest temperature in the central zone of the kiln. The temperature to which the ceramic bodies being processed in the tunnels 43 are subjected gradually diminishes from the central high temperature zone towards the entrance and exit ends of the kiln. Thus the air entering the tunnels 43 at the exit end of the kiln serves to gradually cool the ceramic bodies being processed as they pass from the central high temperature zone toward the exit end of the kiln. The air so entering the tunnels 43 at the exit end of the kiln and passing through said tunnels by natural draft attains high temperature as it passes through the central high temperature zone and serves to preheat the ceramic bodies entering the tunnels 43 at the entrance end of the kiln as such heated air passes through said tunnels and outwardly at the entrance ends thereof. In order, however, to control the temperature of the air passing through the tunnels 43 from the central high temperature zone toward the entrance end of the kiln so that the heated air will not preheat the ceramic bodies entering the tunnels too suddenly to too high a temperature, an air passage 122 is provided for interconnection with two chimney passages 123 and 124 for providing draft of air therethrough serving to reduce the temperature of the air passing through the tunnels 43 from the central high temperature zone toward the entrance end of the kiln.

Similarly, in order to assist in cooling ceramic bodies passing through the tunnels 43 from the central high temperature zone toward the exit end of the kiln there are provided air passages or chimneys 125 extending vertically through the kiln, and an air passage 122′ communicating with air passages or chimneys 123′ and 124′.

The kiln is designed so that a very high temperature of about two thousand degrees (2,000°) Fahrenheit, or higher, is produced in the firing zone of the kiln, the temperatures diminishing gradually from that zone progressively towards the entrance and exit ends of the kiln.

Thus cooler air entering the tunnels or channels 43 at the exit end of the kiln and passing through said tunnels by natural draft action serves first to cool the tile which are disposed in said tunnels nearest the exit end of the kiln and as the air passes through the tunnels toward the entrance end it is gradually brought up to the maximum temperature in the central firing zone and then diminishes in temperature as it passes from the firing zone toward the entrance end of the kiln where it serves nevertheless to preheat the tiles as they enter the trunnels adjacent the entrance end of the kiln. Thus the natural draft action of air entering the tunnels at the exit end of the kiln and passing therethrough by natural draft action serves first to cool the tile units nearest the exit end of the kiln and then serves later to preheat the tile units as they enter the tunnels adjacent the entrance end of the kiln. This natural draft action of the air through the kiln tunnels is effective solely by virtue of the slope of the tunnels and requires no fans or other means for forcing air therethrough.

In the foregoing connection it will be understood that for proper curing and firing of the tile they have to be brought gradually up to the maximum temperature in the firing zone and then have to be gradually cooled down from that maximum temperature and this is accomplished in the manner hereinbefore described.

In the particular embodiment of the kiln shown the tunnels or channels 43 are arranged in four vertical rows each of said rows having six tunnels disposed one above the other.

As seen in FIGURE 8, each of the tunnels 43 is completely lined with refractory material such as 51 which not only extends vertically but horizontally between the vertically spaced tunnels of each vertical row thereof. Extending lengthwise or longitudinally of each tunnel 43 there is provided a central rib 53 extending upwardly from the bottom of each tunnel and effectively dividing each tunnel into two side by side channels. Within each of these channels there is provided removable refractory floor means consisting of a plurality of interlocking refractory floor units 54 as seen in FIGURES 5, 8 and 10, the floor units 54 being individually shown in more detail in FIGURES 11 to 14, 20 and 21.

The removable refractory floor units 54 are provided with interlocking tongue and groove elements novelly arranged in overlapping relation designed to prevent the units 54 from buckling and further designed to prevent any tile body particles which might separate from the tile units passing through the kiln from entering any crevices which might otherwise be accessible between the floor units 54. This design of the interlocking floor members 54 prevents build-up of tile body particles and glaze dust between the permanent floor of the kiln and the removable floor units 54.

Referring to FIGURES 11 to 14 inclusive, 20 and 21 the floor units 54 are provided with ridge portions 54a at opposite side edges thereof and, extending parallel to the ridges 54a, each unit is provided with a pair of recesses 54b which receive the rails or guides 41 and serve to maintain alignment of the latter extending through the tunnels in the kiln. As previously mentioned the tile units 24 slide on these guides 41 during their passage through the tunnels of the kiln.

Each of the floor units 54 is provided at one edge with a pair of tongue members 54c extending from the bottom portion of the floor unit 54 in a common plane and a third aligning tongue or lug element 54d extending from the same edge of the floor unit 54 but located in a plane parallel to and spaced from the plane of the tongues 54c. At the opposite edge of each floor unit 54 same is provided with undercut portions 54e which receive the tongue elements 54c of an adjacent unit 54 in underlapping relation. At the last mentioned edge each floor unit 54 is provided with a recess 54f which receives the tongue element 54d of an adjacent floor unit in overlapping relation. Also at the last mentioned edge of each floor unit the body portion of the unit intermediate the undercut portions 54e provides an aligning lug element 54g which is received between the tongue or tongue elements 54c and in conjunction therewith serves to assist in maintaining longitudinal alignment of the adjacent floor units.

It will be noted that the tongue elements 54c are horizontally spaced from one another in a common horizontal plane, that the tongue elements 54d is vertically spaced from the tongue elements 54c and overhangs both of the latter, that the recess 54f corresponds to the tongue element 54d, and that the recesses or undercut portions 54e correspond to the respective tongue elements 54c.

From the foregoing it will be seen that the interlocking edges of the floor units 54 are designed to interfit and interlock with one another so that the edges of adjacent floor units 54 overlap one another in such a manner that the floor units are prevented from becoming buckled or misaligned and particles of tile body material and glaze dust is prevented from passing beneath the removable floor so as to get between the removable floor units and the permanent floor of the tunnel.

The rails or guides 41 will preferably be circular in cross section so as to reduce frictional engagement with the ceramic bodies passing therealong thus minimizing wear caused thereby. The guides 41 may be made of any suitable material such as metal suitably hardened, or said guides may be made of combinations of metal and ceramic or other materials. As these circular guides wear in use they may be rotated periodically so as to cause them to wear all around rather than to create too much of a flat surface in any one location. The principal wear occurs on the guides at the portions thereof nearest the exit end of the kiln after the ceramic bodies guided therealong have passed through the firing zone and have become hard and therefore more abrasive. In order to reduce the costs of replacement of the guide 41 due to wear in use, I provide a combination of metal and ceramic construction such as illustrated in FIGURES 22 and 23 wherein the section 41a of the guide 41 disposed in the preheat zone of the kiln and the section 41b disposed in the cooling zone of the kiln may both comprise solid cylindrical sections of hardened metal and the portions of the guide 41 disposed in the firing zone of the kiln may comprise a plurality of short hollow ceramic tubes 41c through which is inserted a solid cylindrical hardened metal sections 41d of sufficient length to accommodate the desired number of smaller ceramic tubular sections 41c, the metal section 41d having an outer diameter approximating the inner diameters of the tubular sections 41c. The ends of the section 41d may be welded to the sections 41a and 41b, or the section 41d may be detachably secured to the sections 41a and 41b, by threading or otherwise.

*Tile pusher means*

Referring now to FIGURES 5, 7, 15 and 15a, it is recalled that the pusher means for pushing the tile through the tunnels 43 of the kiln comprises a respective pusher device for each tunnel of the kiln 39 said pusher devices being located at the entrance end of the kiln. Each of said pusher devices comprises a pusher member 44 mounted for sliding movement on a respective pusher frame 42 supported upon suitable frame work including the frame members 55 carried by vertical columns 56. At the outer end of each pusher frame 42 there is provided means for securing the outer ends of the guides 41. As shown, each pusher frame comprises a pair of steel plates 42a from which the marginal outer portions are cut away to provide the shoulders 42b. Suitably mounted on the outer reduced width portions 42c of the plates 42a is a cover plate 42d upon which plate the guides 41 rest, the latter being clamped to said plate 42d by means of suitable clamping brackets 42e secured to plates 42d by means of screws 42f.

The pusher assembly generally indicated by the numeral 44 and which slides on the pusher frame 42 includes the pusher plate 44a which is mounted for engagement with the edges of tile units positioned on the guides 41. The pusher plate 44a is secured by means of bolts 44b to be a plate 44c which extends beneath the pusher frame plates 42a and has secured thereto a slide unit 44d which is mounted to slide along the guideway 42g provided at the inner edges of the plates 42a. The guideways 42g are provided by milling the inner edges of the plates 42a to provide shouldered portions of thinner section upon which the slide plate 44e slides between the shoulders which serves to guide the longitudinal movement thereof. The slide unit 44d includes in addition to the slide plate 44e a spacer plate 44f and a bottom plate 44g which extends beneath the guideway 42g. The slide unit 44d consisting of the plates 44e, 44f and 44g is secured to the plate 44c by means of bolts 44h.

The actuating means for effecting movement of the pusher device 44 relative to the pusher frame 42 comprises a link 58 connected by pivot bolt 59 to plate 44k, secured to plate 44c by bolts 44h, the other end of link 58 being pivotally connected at 60 to one arm 61a of a bell crank 61 which is pivotally connected at 62 to one of the plates 42a. The other arm 61b of the bell crank 61 is pivotally connected at 62 to link 63 which in turn is pivoted at 64 to crank arm 65 fixed to one of the crank shafts 66. There are four of the crank shafts 66, one for each vertical row of pusher devices provided for the respective tunnels 43. Each of the crank shafts 66 is journaled in suitable bearing 67 carried by bearing frame 68 secured to the vertical columns 56.

Suitable operating mechanism is provided to effect partial rotation of the crank shafts 66 to effect movement of the pushers 44 relative to the pusher frames 42 through the linkage previously described.

Referring to FIGURE 7, in the embodiment shown, the two left hand vertical rows of pushers 44 are operated simultaneously to push tile units into the respective tunnels of the kiln and likewise the two right hand vertical rows of pushers are so operated simultaneously but separately from and in timed sequence to the operation of the pushers for the two left hand vertical rows. For this purpose two hydraulic operating units 69 and 69' are provided one for operation of each of the aforesaid two groups of pushers. For example, the hydraulic cylinder 70 of the unit 69 is pivotally connected as at 71 to a suitable bracket 72 secured to one of the vertical columns 56. The piston 73 of the hydraulic unit 69 has threadedly connected thereto a rod 74 the other end of which is connected to a rod end bearing 75 which is carried by a bearing pin 76 which interconnects the links 77 which in turn are pivotally connected as at 77a to cranks 78 fixed to one of the crank shafts 66.

The hydraulic system for operating the hydraulic units 69 and 69' is shown as including the fluid supply lines 79, a flow control valve 80 and a double solenoid four-way hydraulic valve 81 for each hydraulic unit 69 and 69'. Fluid is supplied to the hydraulic units 69 and 69' through the common supply lines 82 and 83 from a suitable oil tank, motor and pump unit generally designated 84.

A timer unit 85 is provided suitably connected to the solenoid valves 81 so as to actuate the same in a predetermined timed sequence so as to actuate the hydraulic units 69 and 69' in like sequence to effect operation of the pushers 44 of the left two vertical rows at one time and to operate the pushers 44 of the right two vertical rows at another time in the predetermined sequence, referring in this connection to FIGURE 7.

It will be understood from the foregoing that as the green tile units 24 pass along the conveyor 38 in front of the operator he will pick up the tile units from the conveyor 38 and place the same in position on the guides 41 for engagement by the pushers 44 to push the green tile units 24 along the guides into the tunnels of the kiln. As previously mentioned, each pair of the guides 41 is arranged so that each rod of each pair engages between ribs 24b of each tile unit placed thereon so that the tile units 24 are guided in their movement along the guides 41. It is to be noted that the travel movement of the pushers 44 is only slightly greater than the length of the tile units 24 so that during each pushing movement of the pushers 44 the tile units 24 are moved a sufficient distance along the rods 41 that when the pushers have returned to their outward limit of movement there will be sufficient distance between the previously pushed tiles to allow the placing of an additional tile unit 24 between the pusher 44 and the previously pushed tile units 24.

In the operation of loading the tile units 24 onto the rods 41 the operator will normally remove two tile units 24 from the conveyor 38 picking up one tile unit in each hand and place these tile units 24 in the empty spaces adjacent one of the pushers 44 in proper position on the rods 41 of one of the two channels of one of the tunnels 43 served by that particular pusher 44. The operator will continue filling the empty spaces of the various channels of, for example, the left hand two vertical rows of tunnels 43, referring to FIGURE 7, until all of the empty spaces of those channels have been supplied with tile units 24. The operator will then proceed in a like manner to fill the empty spaces in the channels of the right hand two vertical rows of tunnels 43, referring to FIGURE 7, by placing tile units 24 in proper position on the guides 41 of those channels.

Meanwhile, in accordance with the timed cycle of operation of the pushers 44, the tile units 24 engaged by the pushers 44 of the left hand two vertical rows of tunnels 43, referring to FIGURE 7, will have been pushed a predetermined distance along the rods 41 by the simultaneous operation of that group of pushers. The timed sequence of movement of the pushers 44 allows enough time for the operator to fill the empty spaces of the channels served by one group of pushers operated simultaneously so that the group of pushers can be operated to move tile units along the guides 41 while the operator is filling the empty spaces of the channels served by the other group of pushers operated simultaneously. Thus first the pushers serving the two left hand vertical rows of tunnels 43 will be operated by the timer 85, then subsequently in the timed cycle the pushers serving the right hand two vertical rows of tunnels 43 will similarly be operated and this alternate sequential operation of the two groups of pushers will continue in the predetermined timed cycle automatically so long as desired.

Thus the pushers 44 will push the rows of tile units through the tunnels 43 of the kiln with the outermost tile 24 directly engaged by the pusher 44 and each of the other tile units in the channels in edge to edge engagement with adjacent tile units. When a channel or channels of the tunnels 43 are fully loaded with tile units 24, of course, each pushing operation of the pusher 44 will serve to discharge one tile unit from each such loaded channel at the exit end of the kiln.

Unloading mechanism

As previously mentioned, there is provided at the exit end of the kiln 39 suitable unloading means for automatically collecting the tile units 24 discharged from the kiln and moving them to an inspection and packaging area. Also as previously mentioned said unloading means generally indicated by the numeral 45 comprises the collector slide plates 46 one of which extends below each series of horizontally spaced tunnels 43, a pusher 47 being provided for each collector slide plate 46.

The collector slide plates are disposed at an appropriate angle which can be an angle of approximately forty-five degrees (45°) from the horizontal and arranged so that the tile units 24 discharged from the exit end of the tunnels 43 will slide onto the collector plates 46 by gravity, each of the collector plates 46 being provided with a bottom flange 46a outstanding therefrom to retain the tile on the plates 46.

These plates 46 are suitably connected to a supporting frame work including the vertical columns 85 and cross frame members 86 and 87, referring to FIGURES 16 to 19 inclusive.

Each of the pusher devices 47 comprises a pusher element 47a which is arranged over the outer face of the collector plate 46 so as to engage edgewise with tile units 24 received on the plate. The pusher element 47a is connected to a carriage frame 47b which extends around the underside of the plate 46, said carriage frame having secured thereto a suitable carriage 47c mounted for sliding movement on a suitable carriage slide 46a connected to said underside of the plate 46. Extending from the carriage 47c is a lug 47d which is connected to one of the endless chains 88 provided for operation of the pushers 47 and extending lengthwise of each collector plate 46. The chains 88 are engaged over sprockets suitably rotatably mounted at the ends of the collector plates, the sprockets 89 being fixed to a common shaft 90 which is rotatably actuated by a suitable electric motor 91 through a belt 92 reaved over a pulley 93 on the shaft 90 and a pulley 94 on the motor drive shaft 95.

The motor 91 may be a reversible gear head motor of common type and is started into operation by engagement of a limit switch 101 (see FIGURE 7) at the loading or entrance end of the kiln which limit switch is actuated at the end of the pushing stroke of the right hand group of pushers 44 (FIGURE 7).

In this connection it is to be noted that whenever the hydraulic unit 69 or 69' is operated in the course of the timed sequence cycle above described, the operation is such that the piston 73 is caused to make its pushing stroke at the end of which it immediately makes its return stroke so that the pushers 44 are similarly actuated for their pushing strokes and immediate return strokes.

Referring to FIGURES 7 and 16, the timer 85 starts the cycle of operation so that, after a predetermined time interval, the hydraulic unit 69 is operated to effectuate the pushing stroke of the left hand group of pushers 44 (FIGURE 7). At the end of said pushing stroke the lower end of bearing pin 76 engages limit switch 100 (FIGURE 7) which reverses operation of hydraulic unit 69 to cause the return stroke of said left hand group of pushers, thus restoring these instrumentalities to their initial ready position for subsequent actuation in accordance with the time cycle. Next, in accordance with this cycle, after a corresponding interval, the timer 85 will cause actuation of hydraulic unit 69' to effectuate the pushing stroke of the right hand group of pushers (FIGURE 7) and at the end of the pushing stroke the lower end of bearing pin 76 engages the limit switch 101 which serves to reverse operation of the hydraulic unit 69' to restore these instrumentalities to their initial ready position and at the same time starts motor 91 (FIGURE 16) into operation which will cause the pushers 47 at the exit end of the kiln 39 to move rightwardly along the collector slide plates 46 so as to collect together and push therealong any tile units 24 which have been discharged from the tunnels 43 onto the collector plates 46.

The carriage of the pusher 47 for the lowermost collector plate 46 is provided with an abutment 47e which engages with the limit switch 96 to turn off the motor 91 when the pushers 47 have approached the limit of their rightward movement relative to the collector plates 46, having reference to FIGURE 16. Subsequent further coasting movement of the pushers 47 causes the abutment 47e to engage the limit switch 97 which starts the motor 91 into reverse operation thereby returning the pushers 47 to the left hand end of the collector plates 46. As the pushers 47 approach the latter end of their stroke the abutment 47e engages the limit switch 98 which turns off the motor 91 allowing the pushers 47 to remain at their normal position at the left hand end of the collector plates 46 until their next cycle of operation initiated at the end of the pushing stroke of the right hand group of pushers 44 at the entrance end of the kiln. The cycling operation above described continues repetitively under control of timer 85.

It will be understood that the rightward movement of the pushers 47 serves to push together the tiles which have been discharged onto the plates 46 so that such tiles will be moved in edge to edge engagement along the collector plates 46 toward the inspection and packaging area. It will be understood that the collector plates 46 extend beyond the kiln into the inspection area where the tile units are inspected and placed in cartons which may be sent along the roller conveyer 99 to the shipping department.

It will be understood from the foregoing that one of the advantages of the apparatus and process of my invention is that for processing certain kinds of ceramic bodies such as the flat tile members 24 referred to it is not necessary to utilize bats or plates made of refractory materials for carrying the ceramic bodies in their movement through the kiln. However the apparatus and process of the invention is also capable of processing other ceramic bodies of small size or irregular shape by the use of plates of refractory material for carrying the same which plates can be placed in edge to edge engagement on the guide 41 for movement of such ceramic bodies through the tunnels 43 of the kiln.

Ceramic body composition

Where green tile units are to be pushed through the tunnels of the kiln in edge to edge engagement, in accordance with my invention, it is essential that such green tile units be formed of a ceramic body composition which when pressed into tile shape will be capable of withstanding edge to edge pushing pressure without buckling or breaking. To this end my invention contemplates provision of such a composition.

For this purpose I preferably provide a ceramic body composition comprising a mixture of ball clay, added silica (silicon dioxide), and either wollastonite (calcium silicate) or talcum powder (magnesium metasilicate), or both wollastonite and talcum powder in varying proportions. I may also include in the composition a small amount of powdered limestone (calcium carbonate) in an amount of approximately 5% to 10% by weight of the composition.

The added silica may comprise powdered silica sandstone and is used in an amount of approximately 5% to 20% by weight of the composition. The ball clays such as generally found in western Kentucky and Tennessee are highly plastic and sticky materials usually having an alumina (aluminum oxide) content of about twenty-five (25) to forty percent (40%) and a silica (silicon dioxide) content of about forty-five (45) to seventy percent (70%). The ball clays being sticky and plastic help to hold the body together when it is pressed. They are also a relatively inexpensive source of alumina. The alumina content is important because it is one of the main ingredients which determine the fusion temperature of the body when it is fired. In my ceramic body composition the ball clay may comprise approximately twenty-five (25) to forty percent (40%) by weight of the composition.

The talcum powder, an inorganic platelet material, improves the pressability of the ceramic body composition and serves to raise the coefficient of thermal expansion thereby making the glaze fit characteristics easy to attain. It further improves the quality and smoothness of the finished ceramic body.

The characteristics of wollastonite are similar to talcum except that since wollastonite is a fibrous material, it produces a more impact resistant ceramic body. Wollastonite is also used to control shrinkage in the firing of the tile. I have discovered however that the use of talcum instead of wollastonite produces a ceramic body with equally good characteristics and with improved pressability and at a somewhat lower cost.

The added silica is an aid in pressing the ceramic body composition and makes it easier to obtain a good glaze fit.

The following are exemplary of specific compositions formulated in accordance with my invention, the preferred proportion being designated by weight:

*Example No. 1*

| | Percent |
|---|---|
| Wollastonite | 55 |
| Ball clay | 30 |
| Silica | 15 |

*Example No. 2*

| | Percent |
|---|---|
| Talcum powder | 55 |
| Ball clay | 30 |
| Silica | 15 |

*Example No. 3*

| | Percent |
|---|---|
| Wollastonite | 27.5 |
| Talcum powder | 32.5 |
| Ball clay | 30 |
| Limestone | 5 |
| Silica | 5 |

The proportions of the foregoing ingredients of the compositions of my invention may be varied in accordance with the following ranges:

| | Percent |
|---|---|
| Wollastonite | 20 to 70 |
| Talcum powder | 20 to 70 |
| Ball clay | 25 to 40 |
| Limestone | 5 to 10 |
| Silica | 5 to 20 |

The ceramic body composition of my invention enables the production of tile units by the processing and apparatus of my invention, which tile units are capable of being pushed in edge to edge engagement both prior to and during firing and curing without buckling or breaking of such tile units. The said body composition enables production of tile units which are better able to withstand heat or cold shock, are more resistant to crazing and cracking and generally have better characteristics than tile units made of prior used ceramic body compositions.

I claim:

1. A kiln of the class described made of high temperature refractory material and having a plurality of tunnels extending from end to end therethrough, and a pair of guides extending through each of said tunnels and arranged to engage and support tile units thereon in guiding relation thereto for sliding movement therealong, each guide including a metal section inserted through one or more ceramic sleeve sections, said tunnels sloping downwardly from their entrance ends to their exit ends to provide a natural draft of air therethrough from the exit ends of said tunnels to the entrance ends thereof, and means for pushing a plurality of tile units in edge to edge engagement along said guides through said tunnels, means comprising a collector plate located adjacent said tunnels at the exit end of the kiln and arranged to receive tile units so pushed through said tunnels, and means for pushing such bodies on said collector plate therealong.

2. Apparatus for making ceramic bodies comprising, in combination, a kiln composed of high temperature refractory material and having a plurality of tunnels extending from end to end therethrough, means providing high temperature in said tunnels for curing and firing such bodies therein, means for pushing such bodies in edge to edge engagement through one group of tunnels at one time, said means being operative to engage the outermost ceramic bodies at the entrance ends of said tunnels to move said bodies into the tunnels an increment of movement and then to retract outwardly to subsequently so engage other such bodies inserted between said pushing means and such bodies previously so moved into said tunnels, means for pushing such bodies in edge to edge engagement through another group of said tunnels at another time, and timing means for operating said pushing means in timed sequential relation.

3. Apparatus as claimed in claim 2, combined with unloading means including a collector plate arranged to receive ceramic bodies discharged from the exit ends of said tunnels, and pusher means operative responsive to operation of said previously mentioned pushing means to push said bodies in edge to edge engagement along said collector plate.

4. A kiln of the class described made of high temperature refractory material and having a plurality of tunnels extending from end to end therethrough, and guide means extending through each of said tunnels and arranged to engage and support tile units thereon in guiding relation thereto for sliding movement therealong, said guide means including a metal section inserted through one or more ceramic sleeve sections.

5. A kiln of the class described comprising high temperature refractory material providing a pair of muffled combustion chambers at a central high temperature zone of the kiln, a wall of said material separating said combustion chambers, a plurality of fuel burners disposed in each of said combustion chambers, baffles in each of said chambers separating the burners therein and extending from the bottom of the kiln vertically and spaced from the top of the kiln and including in one of said chambers a baffle so disposed and situated between the burners and the entrance end of the kiln, another baffle extending from the top of the kiln and spaced from the bottom thereof and situated between the last mentioned baffle and the entrance end of the kiln, the space below the last mentioned baffle communicating with a chimney for exhaust of gases to the atmosphere, the arrangement of the burners and baffles being such as to provide a common passage above said burners through which the flames produced by those burners or the heat therefrom may pass and thence downwardly through the passage provided by the last two mentioned baffles, thence around the bottom of the last mentioned baffle and then upwardly to be exhausted from said chimney; a plurality of corresponding burners and baffles arranged in the other combustion chamber and disposed between said separating wall and the exit end of the kiln and providing a similar upward and then downward passage of the flames of the latter group of burners, or the heat therefrom, and a second chimney disposed between the exit end of the kiln and the last baffle in progression and communicating with said passage for exhaust therefrom through said chimney.

6. A kiln of the class described comprising high temperature refractory material providing a pair of muffled combustion chambers at a central high temperature zone of the kiln, a wall of said material separating said combustion chambers, a plurality of fuel burners disposed in each of said combustion chambers, baffles in each of said chambers separating the burners therein and extending from the bottom of the kiln vertically and spaced from the top of the kiln and including in one of said chambers a baffle so disposed and situated between the burners and the entrance end of the kiln, another baffle extending from the top of the kiln and spaced from the bottom thereof and situated between the last mentioned baffle and the entrance end of the kiln, the space below the last mentioned baffle communicating with a chimney for exhaust of gases to the atmosphere, the arrangement of the burners and baffles being such as to provide a common passage above said burners through which the flames produced by those burners or the heat therefrom may pass and thence downwardly through the passage provided by the last two mentioned baffles, thence around the bottom of the last mentioned baffle and then upwardly to be exhausted from said chimney; a plurality of corresponding burners and baffles arranged in the other combustion chamber and disposed between said separating wall and the exit end of the kiln and providing a similar upward and then downward passage of the flames of the latter group of burners, or the heat therefrom, and a second chimney disposed between the exit end of the kiln and the last baffle in progression and communicating with said passage for exhaust therefrom through said chimney, and air passages located adjacent the entrance and exit ends of the kiln and arranged for natural passage of air through said air passages vertically through the kiln.

7. Apparatus for making ceramic bodies, comprising, in combination, a kiln composed of high temperature refractory material and having a plurality of tunnels extending from end to end therethrough and arranged in vertical and horizontal rows, means providing high temperature in said tunnels for curing and firing such bodies therein, means for pushing such bodies in edge to edge engagement through one group of vertical rows of said tunnels at one time, means for pushing such bodies in edge to edge engagement through another group of vertical rows of said tunnels at another time, said means being operative to engage the outermost ceramic bodies at the entrance ends of said tunnels to move said bodies into the tunnels an increment of movement and then to retract outwardly to subsequently so engage other such bodies inserted between said pushing means and such bodies previously so moved into said tunnels, and timing means for operating said pushing means in timed sequential relation.

8. Apparatus as claimed in claim 7, combined with unloading means including a plurality of collector plates at the exit end of the kiln, each collector plate arranged to receive such bodies so pushed through a respective horizontal row of said tunnels and discharged from the exit ends of those tunnels, and pusher means for each collector plate simultaneously operative automatically responsive to operation of said previously mentioned pushing means to push said bodies in edge to edge engagement along said collector plates.

References Cited by the Examiner

UNITED STATES PATENTS

| | | | |
|---|---|---|---|
| 60,029 | 11/66 | McDonald | 25—142 |
| 399,276 | 3/89 | Milliken | 259—44 |
| 409,489 | 8/89 | Nungesser | 25—142 |
| 642,135 | 1/00 | Koch | 259—44 |
| 644,520 | 2/00 | Jones. | |
| 839,833 | 1/07 | Gery | 25—142 |
| 1,079,443 | 11/13 | Shaw. | |
| 1,183,760 | 5/16 | Parker | 25—156 |
| 1,348,486 | 8/20 | Dressler. | |
| 1,437,769 | 12/22 | Meehan | 25—142 |
| 1,471,875 | 10/23 | Witte | 25—142 |
| 1,485,109 | 2/24 | Beth et al. | 25—142 |
| 1,585,013 | 5/26 | Booth | 25—142 |
| 1,617,919 | 2/27 | Madsen | 209—234 |
| 1,695,272 | 12/28 | Christian | 198—57 |
| 1,802,235 | 4/31 | Campbell | 25—142 |
| 1,950,375 | 3/34 | Agnew | 25—142 |
| 2,039,445 | 5/36 | Parmelee | 25—142 |
| 2,215,581 | 9/40 | Fackt. | |
| 2,256,275 | 9/41 | Boland | 25—142 |
| 2,347,535 | 4/44 | Bair | 117—123 |
| 2,377,666 | 6/45 | Bole et al. | 25—156 |
| 2,507,076 | 5/50 | Wilde | 25—142 |
| 2,519,250 | 8/50 | Jeppson et al. | |
| 2,534,518 | 12/50 | Jeppson | 25—142 |
| 2,567,077 | 9/51 | Moon | 106—58 |
| 2,658,603 | 11/53 | Fernald | 198—57 |
| 2,704,605 | 3/55 | Dahlman | 209—234 |
| 2,729,872 | 1/56 | Peterson | 25—142 XR |
| 2,813,305 | 11/57 | Robson et al. | 18—47.5 |
| 2,880,098 | 3/59 | Jones | 106—68 |
| 2,910,760 | 11/59 | Jackson | 25—57 |
| 2,928,158 | 3/60 | Miller | 25—142 |
| 2,975,499 | 3/61 | Lapp | 25—142 |

FOREIGN PATENTS

| | | |
|---|---|---|
| 181,502 | 6/22 | Great Britain. |
| 835,672 | 9/58 | Great Britain. |

WILLIAM J. STEPHENSON, *Primary Examiner.*

MICHAEL V. BRINDISI, ROBERT F. WHITE, *Examiners.*